United States Patent
Strandjord et al.

(10) Patent No.: US 8,259,301 B2
(45) Date of Patent: Sep. 4, 2012

(54) CAVITY LENGTH MODULATION IN RESONATOR FIBER OPTIC GYROSCOPES

(75) Inventors: Lee Strandjord, Tonka Bay, MN (US); Glen A. Sanders, Scottsdale, AZ (US); Tiequn Qiu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 392 days.

(21) Appl. No.: 12/565,510

(22) Filed: Sep. 23, 2009

(65) Prior Publication Data

US 2010/0225922 A1    Sep. 9, 2010

Related U.S. Application Data

(60) Provisional application No. 61/158,038, filed on Mar. 6, 2009.

(51) Int. Cl.
*G01C 19/72*    (2006.01)
(52) U.S. Cl. .................................................. 356/461
(58) Field of Classification Search .............. 356/460, 356/461, 466, 470
See application file for complete search history.

(56) References Cited

U.S. PATENT DOCUMENTS

| | | | |
|---|---|---|---|
| 4,274,742 A * | 6/1981 | Lustig | ............. 356/470 |
| 4,673,293 A | 6/1987 | Sanders | |
| 5,018,858 A | 5/1991 | Malvern | |
| 5,493,623 A | 2/1996 | Frische et al. | |
| 2007/0242276 A1* | 10/2007 | Hughes et al. | ............. 356/461 |

FOREIGN PATENT DOCUMENTS

JP    2009047684    3/2009

OTHER PUBLICATIONS

European Patent Office, "European Search Report", Apr. 6, 2011, Published in: EP.
European Patent Office, "Office Action", Oct. 27, 2011, Published in: EP.

* cited by examiner

*Primary Examiner* — Gregory J Toatley
*Assistant Examiner* — Dominic J Bologna
(74) *Attorney, Agent, or Firm* — Fogg & Powers LLC

(57) ABSTRACT

Systems and methods for reducing rotation sensing errors in a resonator fiber optic gyroscope. An example method propagates a primary light wave through a resonator having an optical fiber and a plurality of optical surfaces for directing the light wave exiting a first end of the optical fiber back into an opposite end of the optical fiber. The optical fiber is wound onto a piezo-electric transducer (PZT) tube. A sinusoidal voltage is applied to the PZT tube to modulate a length of a fiber cavity within the optical fiber. The amplitude and frequency of the fiber cavity length modulation is selected to produce a relative phase modulation between the primary light wave and a double-back reflected light wave, such that the rotation sensing errors resulting from double backscatter of light is at a frequency above a frequency band of interest. This allows the associated error to be filtered out of the rotation rate signal.

14 Claims, 3 Drawing Sheets

CAVITY LENGTH MODULATION IN RESONATOR FIBER OPTIC GYROSCOPES

PRIORITY CLAIM

The present invention claims the benefit of U.S. Provisional Application Ser. No. 61/158,038 filed Mar. 6, 2009, the contents of which are hereby incorporated by reference.

BACKGROUND OF THE INVENTION

The resonator fiber optic gyroscope (RFOG) has tremendous potential of meeting the needs of many navigation and attitude control markets and creating new markets. The reason for this great potential is the RFOG has promise of being the lowest cost and smallest sized gyro for a high performance rotation sensing device. One problem of the RFOG achieving the required performance levels is double backscatter or double back-reflections within the resonant ring, which introduces an error in rotation sensing.

RFOGs work by measuring the resonance frequency shift of a ring resonator between two counterpropagating waves that are directed to propagate within the ring resonator. The resonant frequency shift is proportional to the rate of inertial rotation about an axis normal to the effective plane in which the resonator is formed. The resonator for an RFOG contains optical fiber for a substantial portion of its round-trip pathlength. For accurate measurement of the resonance frequencies of an RFOG, and hence the rotation rate, light waves coupled into the resonator in clockwise (CW) and counter clockwise (CCW) directions are required to propagate substantially independently in the CW and CCW (and substantially in only their intended direction, hence termed "signal waves") inside the ring resonator.

In practice, however, optical surfaces, or interfaces inside the resonator may direct a fraction of each of the light waves into the opposite propagation direction. One class of cases of these unwanted imperfections is when a fraction of light from one wave is reflected into the opposite direction through an odd number of reflections. This produces a parasitic wave of light that was, for instance, derived from CW propagating light in the resonator that eventually (undesirably) propagates in the CCW direction. This parasitic was produces optical interference effects between the intended, CCW "signal" wave (that has propagated solely in the CCW direction) and the parasitic wave in the CCW direction. The same phenomena may also occur by light reflected an odd number of times that originated in the CCW direction, producing a parasitic wave in the CW direction that interferes with the "signal" wave in the CW direction. The impact of resulting interference in either the CW or CCW directions on rotation measurement (caused by odd number of reflections in the resonator) may be greatly attenuated if the CW and CCW light waves are separated in wavelength significantly and/or modulated and demodulated at different frequencies. However, a second class of these imperfections also exists, that is, if lightwaves are reflected by an even number of reflections. The technique used to mitigate the first class of unwanted imperfections will not work because the reflected parasitic light wave will have the same wavelength and/or modulation frequency as the primary "signal' light wave, since it is derived from the primary "signal" light wave and cannot be rejected through the demodulation process. A light wave that travels along a path that involves being reflected twice (involving two reflections, which produces the highest intensity of reflected-waves among those through even number of reflections) forms a parasitic interferometer with the signal light wave and creates distortions of the resonance line shape. These distortions lead to bias errors in the measured rotation rate. Finding methods to reduce such errors stemming from such spurious double reflection paths is important for improving the RFOG performance.

SUMMARY OF THE INVENTION

The present invention provides systems and methods for reducing rotation sensing errors in a resonator fiber optic gyroscope. An example method propagates a primary light wave through a resonator having an optical fiber and a plurality of optical surfaces for directing or enabling the light wave exiting a first end of the optical fiber back into an opposite end of the optical fiber. The optical fiber is wound onto a piezo-electric transducer (PZT) tube. A sinusoidal voltage is applied to the PZT tube to modulate a length of a fiber cavity within the optical fiber. The amplitude of the fiber cavity length modulation is selected to produce a relative phase modulation between the primary (or signal) light wave and a double-back reflected light wave, such that the rotation sensing errors resulting from double backscatter is at a frequency above a frequency band of interest. This allows the associated error to be filtered out.

BRIEF DESCRIPTION OF THE DRAWINGS

Preferred and alternative embodiments of the present invention are described in detail below with reference to the following drawings.

DETAILED DESCRIPTION OF ONE EMBODIMENT

Figure 1:
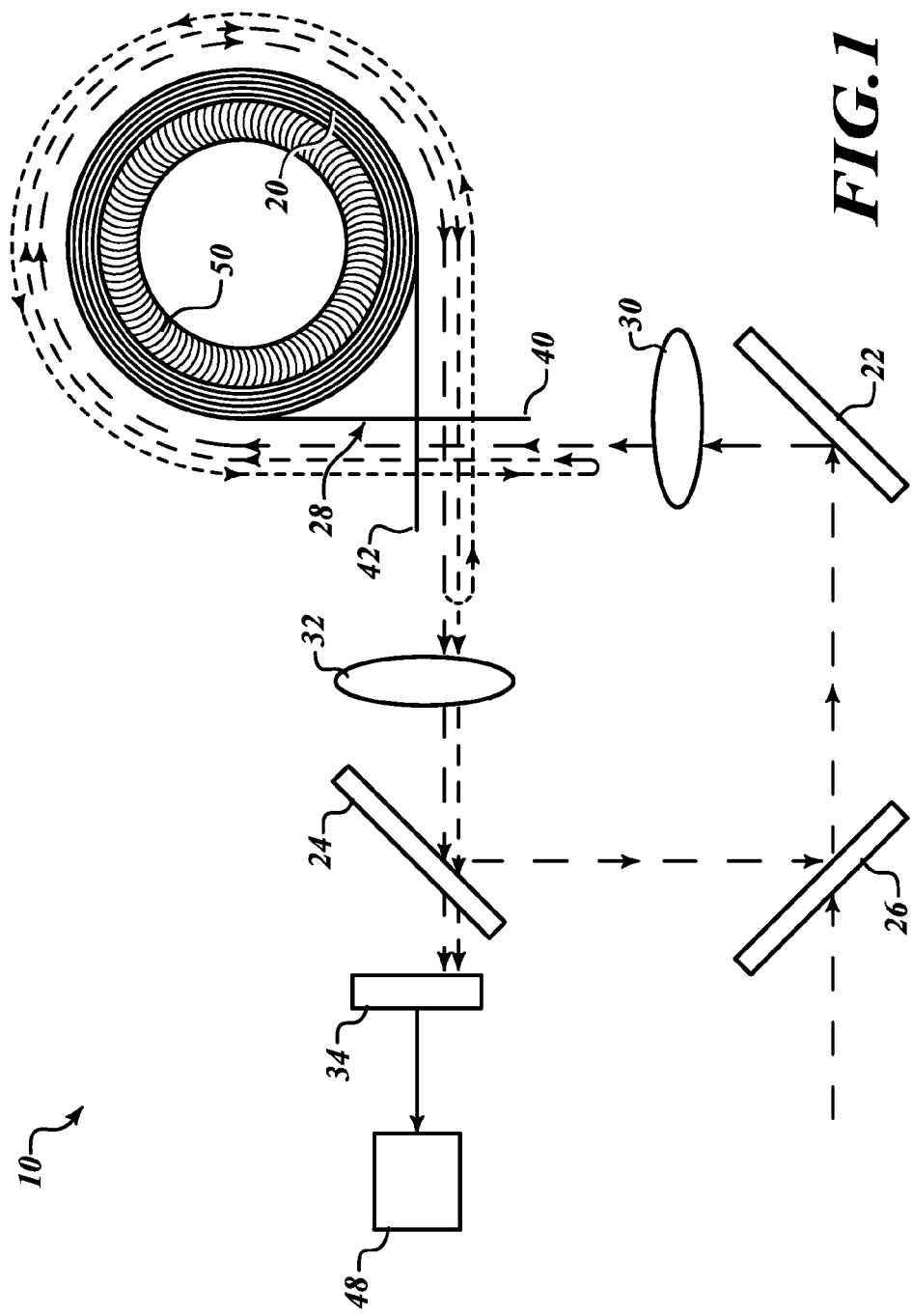
FIGS. 1 and 3 are a schematic diagram of a resonator fiber optic gyroscope formed in accordance to embodiments of the present invention.

FIG. 1 shows a resonator fiber optic gyroscope (RFOG) 10 that uses cavity length modulation to suppress backscatter errors. The RFOG 10 includes a light wave source (not shown), a partially transmissive input mirror 26, a photodetector 34 and a resonator coil 20 that includes an optical fiber 28 having ends at points 40 and 42, a partially transmissive counterclockwise (CCW) output mirror 22, a partially transmissive clockwise (CW) output mirror 24, and collimating lenses 30, 32. The closed ring resonator path is defined by a light path, say in the CW direction from the reflecting (inside surface) of the partially transmissive input mirror 26 to the partially transmissive counterclockwise (CCW) output mirror 22, through lens 30, to fiber end at point 40, through fiber 28, to fiber end at point 42 through the lens 32 to partially transmissive clockwise (CW) output mirror 24, back to the reflecting (inside surface) of the partially transmissive input mirror 26 and back to the partially transmissive counterclockwise (CCW) output mirror 22; thus, reproducing its path. In the same way light may travel in the CCW direction within the fiber coil 20 and reproduce its path.

In FIG. 1, only the CW wave is shown for simplicity. The input light wave enters the resonator 20 at the partially transmissive input mirror 26. Most of the wave reflects off the CCW output mirror 22, passes through the lens 30 and enters the fiber at a point 40 to produce a wave propagating in the CW direction of the fiber coil 20. The non-reflecting portion of the wave is the primary wave, which passes through the resonator fiber 28 and exits at a point 42. The primary wave is then collimated by the lens 32 and travels to the CW output mirror 24 where most of the primary wave is reflected so that it re-circulates through the resonator coil 20 and a small portion exits the resonator at the partially transmissive clockwise (CW) output mirror 24. This small portion of the primary wave that exits the resonator at partially transmissive clockwise (CW) output mirror 24 propagates to the photodetector 34 where the intensity of the wave is converted to an electrical signal.

Since the resonator fiber end faces cannot be made to have a perfect index match with the free-space medium outside the fiber, there will always be some back-reflection from the fiber end faces. When the primary wave exits the fiber at the point 42, a small portion reflects back into the CCW direction of the resonator fiber coil 20 and exits at the point 40, where again a small portion of the back-reflected wave reflects back into the CW direction of the resonator fiber 28. The double back-reflected wave travels through the resonator fiber 28, exits the fiber at the point 42, and a small portion exits the resonator at the CW output mirror 24. The double back-reflected wave will interfere with the primary wave at the photodetector 34 and will cause rotation sensing errors by distorting the resonance lineshape.

For every pass the primary wave makes through the resonator fiber coil 20 the double back-reflected wave makes three passes (one pass along with the primary wave and two passes after the first reflection). Therefore the double back-reflected wave travels a different path-length than the primary wave and will have a phase shift relative to the primary wave. The relative phase will depend on the path-length difference between the two waves. The path-length difference will be a function of fiber length, fiber index of refraction, mirror spacing and many other resonator mechanical parameters that have a dependence on temperature and other environmental parameters. Therefore the relative phase will be a function of temperature and will lead to unstable rotation sensing errors.

The interference of two light waves can be expressed as $$I = E_1^2 + E_2^2 + 2E_1 E_2 \cos[\phi(t)] \tag{1}$$

where I is the resulting light intensity of the two interfering waves, $E_1$ is the electric field amplitude of the first (CW or CCW) primary or signal wave, $E_2$ is the electric field amplitude of the second, or parasitic wave (CW or CCW), and $\phi(t)$ is the relative phase between the two waves. The relative phase is shown to be a function of time, but also could be expressed as a function of temperature or some other environmental parameter that varies in time. Since $\phi(t)$ will be driven primarily by environmental parameters that change very slowly (<1 Hz), like temperature, then the rotation sensing errors it produces will typically be at low frequencies (<1 Hz). The present invention suppresses these errors by frequency shifting the error to a much higher frequency, out of the frequency band of interest, where the errors can be easily filtered out of the rotation signal.

The frequency band of interest is related to the application of the sensor. For example, the frequency band of interest for navigation applications is typically much less than 1 Hz. For pointing applications the frequency band of interest is typically less than 100 Hz.

The RFOG 10 modulates the cavity length (i.e., length of the fiber 28) in order to frequency shift the errors. FIG. 1 shows the resonator fiber coil 20 wound on a piezo-electric transducer (PZT) tube 50. When a voltage is applied to the PZT tube 50, the diameter of the tube changes, which either stretches or relaxes the length of fiber 28. The change in fiber length is on the order of 200 nanometers. This causes the optical path-length of the resonator coil 20 to change by either changing the length of the fiber and/or the index of refraction of the fiber. For hollow core fiber practically all the optical length change is due to a physical length change, whereas for solid core fiber, roughly 80% of the optical path length change is due to an index change. Since the double back-reflected parasitic wave travels three times through the loop of the resonator fiber 28 for every time the primary wave travels through the loop, the phase of the double back-reflected wave will be modulated with more phase amplitude than the primary signal wave in that direction, and therefore there will be a net relative phase modulation between the two waves. The relative phase modulation θ(t) is sinusoidal and expressed as $$\theta(t) = \theta_a \sin(\omega_m t) \tag{2}$$

where $\theta_a$ is the cavity modulation amplitude in relative phase between the primary signal wave and the parasitic double back-reflected wave, and $\omega_m$ is the cavity modulation angular frequency.

Equation 1 can be rewritten as $$I = E_1^2 + E_2^2 + 2E_1 E_2 \cos[\phi(t) + \theta_a \sin(\omega_m t)] \tag{3}$$

Using trigonometric identities Equation 3 can be rewritten as $$I = E_1^2 + E_2^2 + 2E_1 E_2 \{\cos[\phi(t)]\cos[\theta_a \sin(\omega_m t)] - \sin[\phi(t)]\sin[\theta_a \sin(\omega_m t)]\} \tag{4}$$

The trig functions $\cos[\theta_a \sin(\omega_m t)]$ and $\sin[\theta_a \sin(\omega_m t)]$ can be expressed as an infinite series of Bessel functions, $$\cos[\theta_a \sin(\omega_m t)] = J_0(\theta_a) + 2\sum_{n=1}^{\infty} J_{2n}(\theta_a)\cos[2n\omega_m t] \tag{5}$$

$$\sin[\theta_a \sin(\omega_m t)] = 2\sum_{n=1}^{\infty} J_{2n-1}(\theta_a)\sin[(2n-1)\omega_m t] \tag{6}$$

In Equations 5 and 6 one can see all the terms in the two infinite series, except for one, will be varying at $\omega_m$ or some multiple integer of $\omega_m$. Therefore if the cavity modulation frequency $\omega_m$ is set high enough, all the terms except for one, the term $J_0(\theta_a)$, will vary at a sufficiently high enough frequency to be out of the band of interest and thus can be filtered out. The remaining term, $J_0(\theta_a)$, can be reduced by setting the cavity modulation amplitude $\theta_a$ to an appropriate value.

Figure 2:
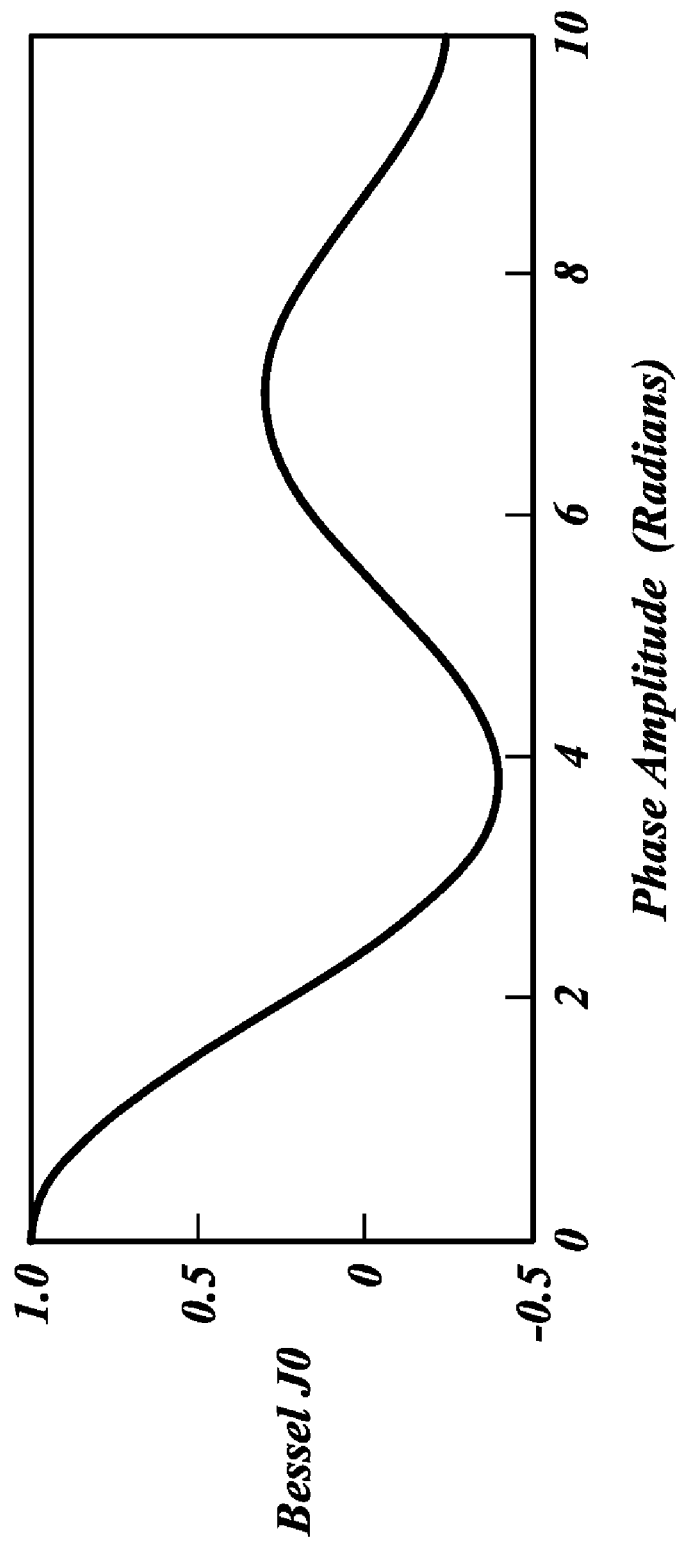
FIG. 2 is a graph of a Bessel function.

FIG. 2 shows a plot of $J_0(\theta_a)$ as a function of the phase modulation amplitude. Notice that $J_0(\theta_a)$ passes through zero at about a phase modulation amplitude of 2.4 radians, again at about 5.5 radians and then again at about 8.6 radians. The closer the phase modulation amplitude is made to one of these nulls the smaller the gyro sensing error.

The cavity modulation does not have to be sinusoidal to suppress errors due to double back-reflection. The modulation can also be a triangle wave with a relative phase amplitude of 2π or integer multiples of 2π. Other types of waveforms can frequency shift the rotation sensing errors due to double back-reflection out of the frequency band of interest. Multiple frequency modulation, or noise modulation, can be used to spread the rotation error over a wide frequency band.

The back-reflections from the fiber end faces are not the only back-reflections that this modulation addresses. Similar combinations of back-reflection or back-scatter from the lenses and mirrors that make extra passes through the resonator fiber 28 will be suppressed with path-length modulation of the fiber 28. However, there are some back-reflections that do not make extra passes beyond that of the primary wave, through the resonator fiber 28.

Figure 3:
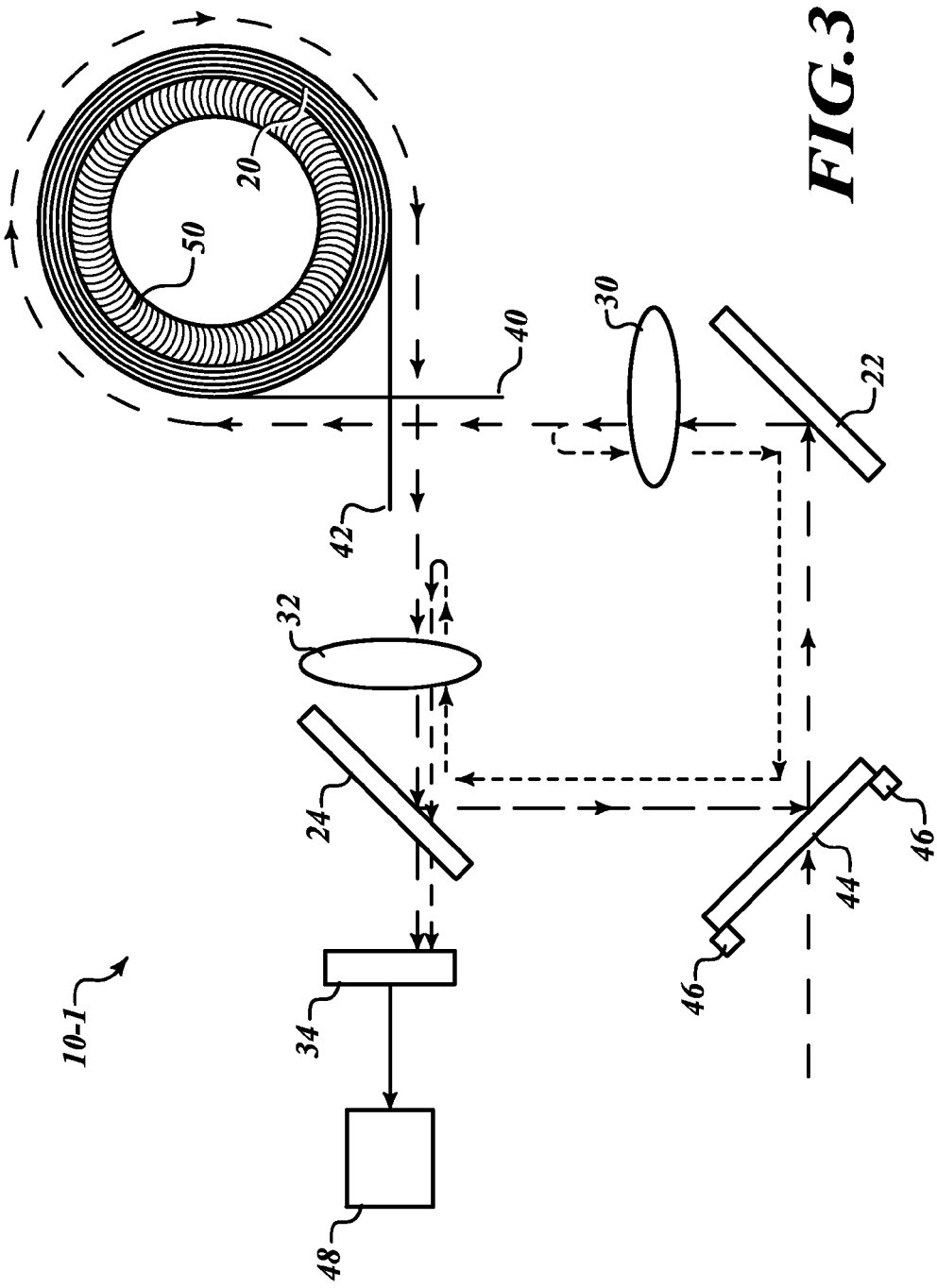

FIG. 3 illustrates a case of when there is light back-reflected off of the fiber end faces after the light enters the fiber 28. In this case it is illustrative to start with a primary wave that has just entered the fiber coil 20 and trace its roundtrip around the resonator. Thus, it is assumed that the primary wave has entered the resonator fiber 28 at the point 40 and is propagating through the coil in the CW direction. The primary wave then emerges from the fiber coil 20 at point 42, is directed back toward fiber coil 20 via mirrors 24, 44, and 22 and re-enters the fiber 28 at point 40 to complete a round trip. Just as the primary light reaches point 40 and is ready to re-enter the fiber, there is also a small back-reflected wave at point 40 that does not re-enter the fiber, is reflected back via mirrors 22, 44, and 24 to point 42 and back-reflected again, eventually re-entering the fiber in the CW direction at point 40 to complete a round-trip of the resonator. The doubly-reflected parasitic wave interferes with the primary wave, each of them traversing the coil once. Thus, there is a parasitic light wave generated by two back-reflections that does go through the resonator fiber 28, but it travels through the fiber coil 20 only once of every pass of the primary wave and therefore the relative phase between the two waves cannot be modulated by modulating the path-length of the resonator fiber. To modulate the relative path-length of the two waves another path-length modulator is added to the appropriate place in the resonator. The position of the modulation is chosen such that secondary wave makes more passes through the modulated region then the primary wave.

FIG. 3 shows an RFOG 10-1 having one or more PZT transducers 46 that are placed on a resonator input mirror 44. The relative phase between the primary CW wave and the double back-reflected CW wave is modulated by applying a modulated signal to the transducers 46. For each pass of the primary wave, the double back-reflected wave makes three passes by the resonator input mirror 44 (one pass along with the primary wave and two passes after the first reflection). The PZT transducers 46 move the resonator input mirror 44 in and out, thus modulating the optical path-length between the points 42 and 40. The choice of amplitude and frequency of the mirror modulation is similar to that of the resonator fiber 28 modulation of FIG. 1.

While one embodiment of the invention has been illustrated and described, as noted above, many changes can be made without departing from the spirit and scope of the invention. Accordingly, the scope of the invention is not limited by the disclosure of one embodiment. Instead, the invention should be determined entirely by reference to the claims that follow.

The embodiments of the invention in which an exclusive property or privilege is claimed are defined as follows:

1. A method for reducing rotation sensing errors in a resonator fiber optic gyroscope (RFOG), the method comprising:
propagating clockwise and counterclockwise primary light waves through a resonator having an optical fiber and a plurality of optical surfaces for directing the light wave exiting a first end of the optical fiber back into an opposite end of the optical fiber;
modulating the pathlength of an optical fiber coil within the resonator based on a previously defined modulation scheme, wherein amplitude and frequency of the fiber cavity length modulation is selected to produce a relative phase modulation between the primary light waves and double-back reflected light waves, such that rotation sensing errors resulting from double backscatter is at a frequency above a frequency band of interest;
generating signals at detectors based on the waves propagating in the resonator; and
determining an output for the gyroscope based on the generated signals, wherein rotation sensing errors are reduced.

2. The method of claim 1, wherein modulating comprises applying a sinusoidal voltage to a piezo-electric transducer tube that is attached to the optical fiber.

3. The method of claim 1, wherein determining comprises demodulating the generated signals and filtering out signals outside the frequency band of interest.

4. The method of claim 3, wherein the frequency band of interest is based on application of the RFOG.

5. A resonator fiber optic gyroscope (RFOG) device comprising:
one or more light wave sources;
two photodetectors;
a resonator comprising:
an optical fiber;
a plurality of optical devices configured to pass light from the one or more light wave sources into opposing directions in the optical fiber, and enable light to be efficiently coupled between ends of the optical fiber, and allow a portion of the light within the resonator to be directed to the photodetectors; and
a transducer attached to the optical fiber, the transducer configured to alter the length of the optical fiber based on a predefined modulation scheme, wherein amplitude and frequency of the fiber cavity length modulation is selected to produce a relative phase modulation between a primary light wave and a double-back reflected light wave, such that rotation sensing errors resulting from double backscatter is at a frequency above a frequency band of interest; and
a processor in signal communication with the photodetectors, the processor configured to determine an output value based on signals generated by the photodetectors.

6. The device of claim 5, wherein the transducer is a piezo-electric transducer tube.

7. The device of claim 6, wherein a sinusoidal voltage is applied to the piezo-electric transducer tube that is attached to the optical fiber.

8. The device of claim 5, wherein the processor demodulates the generated signals then filters out signals outside a frequency band of interest.

9. The device of claim 8, wherein the frequency band of interest is based on application of the RFOG.

10. A resonator fiber optic gyroscope (RFOG) device comprising:
one or more light wave sources;
two photodetectors;
a resonator comprising:
an optical fiber;
a plurality of optical devices configured to pass light from the one or more light wave sources into opposing directions in the optical fiber, and enable light to be efficiently coupled between ends of the optical fiber, and allow a portion of the light within the resonator to be directed to the photodetectors; and
at least one transducer attached to one or more of the plurality of optical devices, the at least one transducer configured to alter the length of the resonator based on a predefined modulation scheme, wherein amplitude and frequency of the resonator length modulation is selected to produce a relative phase modulation between a primary light wave and a double-back reflected light wave, such that rotation sensing errors resulting from double backscatter is at a frequency above a frequency band of interest; and a processor in signal communication with the photodetectors, the processor configured to determine an output value based on signals generated by the photodetectors.

11. The device of claim 10, wherein the at least one transducer is one or more piezo-electric transducers.

12. The device of claim 11, wherein a sinusoidal voltage is applied to the at least one piezo-electric transducer.

13. The device of claim 10, wherein the processor demodulates the generated signals then filters out signals outside a frequency band of interest.

14. The device of claim 13, wherein the frequency band of interest is based on application of the RFOG.

* * * * *